C. A. WITHAM.
TIRE SPREADER.
APPLICATION FILED JULY 30, 1920.
1,367,446.
Patented Feb. 1, 1921.
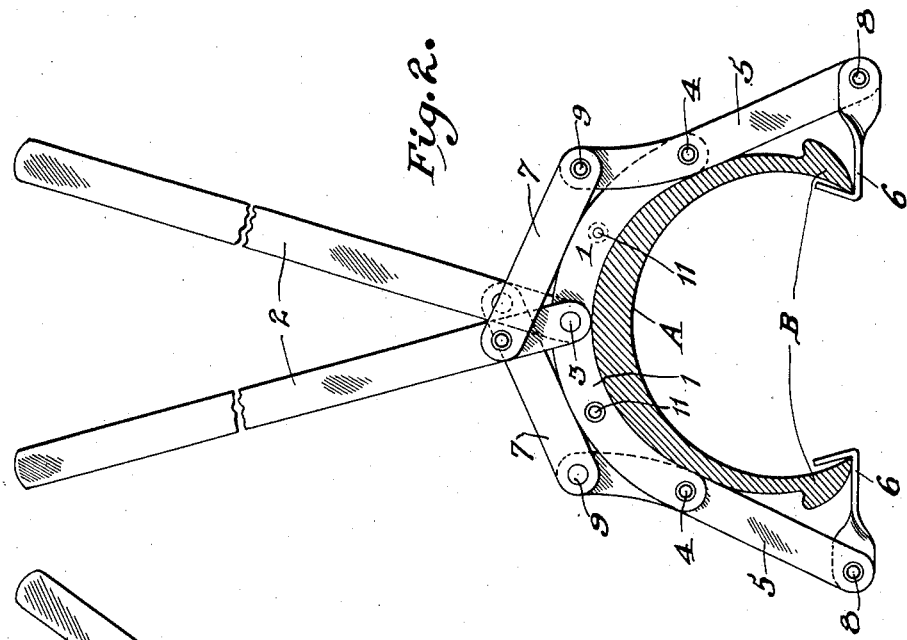
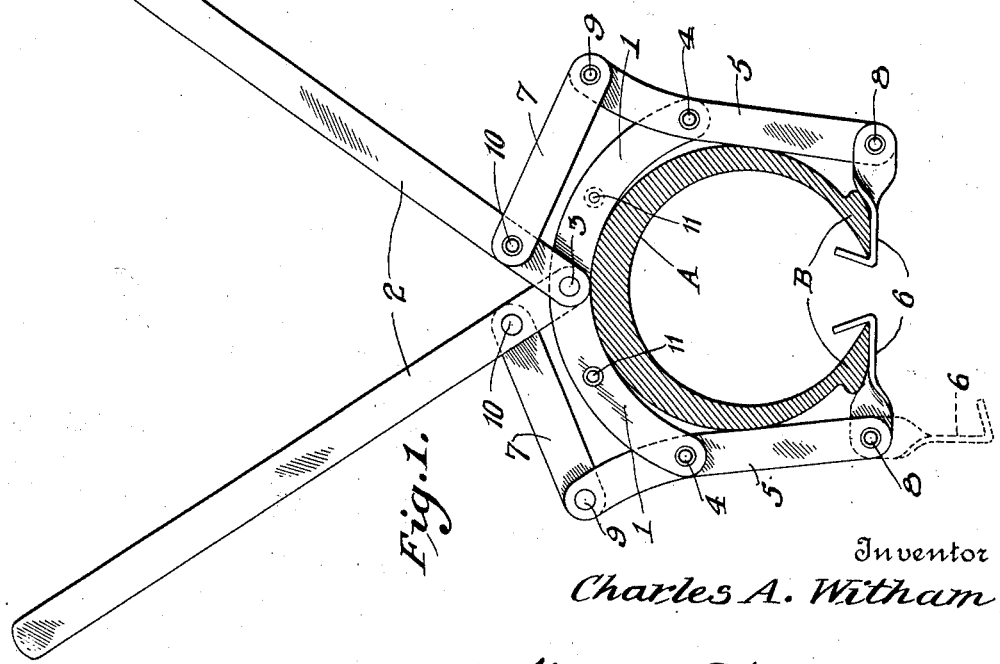
Inventor
Charles A. Witham
By Mason Fenwick & Lawrence
Attorneys

UNITED STATES PATENT OFFICE.

CHARLES A. WITHAM, OF LEWISTON, MAINE.

TIRE-SPREADER.

1,367,446. Specification of Letters Patent. Patented Feb. 1, 1921.

Application filed July 30, 1920. Serial No. 400,005.

*To all whom it may concern:*

Be it known that I, CHARLES A. WITHAM, citizen of the United States, residing at Lewiston, in the county of Androscoggin and State of Maine, have invented certain new and useful Improvements in Tire-Spreaders; and I do hereby declare the following to be a full, clear, and exact description of the invention, such as will enable others skilled in the art to which it appertains to make and use the same.

This invention relates to tools for spreading tires and more particularly for spreading the heavy tread tires commonly used on automobiles.

The object of the invention is to provide a simple, efficient, easily applied and operated device of the character mentioned.

The invention consists in the novel structure, arrangement and combination of parts as hereinafter more particularly described and claimed.

One sheet of drawings accompanies this specification as part thereof in which like reference characters denote like parts throughout.

Figure 1 is a side view showing a tire in cross section and the device applied to the tire.

Fig. 2 shows the device after spreading the tire.

Referring to the drawings, an arched bearing member 1 has two handles 2—2 pivoted centrally thereof as at 3. On each extremity at 4—4 is pivoted a lever 5. Links 7 connect handles 2—2 with levers 5—5 being pivoted to said parts at 10 and 9 respectively. Hooks 6 are pivoted to the lower ends of levers 5—5 at 8. A common form of tire is shown at A having heavy rims B.

By pushing handles 2—2 apart hooks 6—6 are brought together and may be placed under the rims of tire as shown in Fig. 1. The handles 2—2 are then drawn together, thus forcing apart hooks 6—6 and spreading the tire as desired. Through the leverage secured by the pivoted handles and the levers 5—5 ample force may be applied with little effort and the tire may be spread with a minimum of trouble and exertion.

What I claim is:

1. A tire spreader comprising an arched member, levers pivotally mounted on the ends of the arched member, hooks carried by said levers below the arched member, and means carried by said arched member for operating said levers.

2. A tire spreader comprising an arched member, double arm levers pivoted on the ends of the arched member, hooks carried by the levers below the arched member, and means carried by the arched member for operating the levers.

3. A tire spreader comprising an arched supporting member, two handles pivotally mounted at the top of said arched member, levers pivotally mounted one at each end of the arched member, links connecting the upper end of each lever with a handle, and a hook pivotally mounted on the lower end of each lever.

In testimony whereof I affix my signature.

CHARLES A. WITHAM.